United States Patent
Getmann et al.

(10) Patent No.: US 10,422,117 B2
(45) Date of Patent: Sep. 24, 2019

(54) SANITARY UNIT WITH MONITORING DEVICE

(71) Applicant: Evac GmbH, Wedel (DE)

(72) Inventors: Dennis Getmann, Wedel (DE); Patrick Meyer, Wedel (DE)

(73) Assignee: Evac GmbH, Wedel (DE)

( * ) Notice: Subject to any disclaimer, the term of this patent is extended or adjusted under 35 U.S.C. 154(b) by 0 days.

(21) Appl. No.: 15/520,909

(22) PCT Filed: Oct. 21, 2015

(86) PCT No.: PCT/EP2015/074361
§ 371 (c)(1),
(2) Date: Apr. 21, 2017

(87) PCT Pub. No.: WO2016/062765
PCT Pub. Date: Apr. 28, 2016

(65) Prior Publication Data
US 2018/0023275 A1 Jan. 25, 2018

(30) Foreign Application Priority Data
Oct. 23, 2014 (DE) .................... 20 2014 008 423 U

(51) Int. Cl.
*E03D 5/02* (2006.01)
*B61D 35/00* (2006.01)
(Continued)

(52) U.S. Cl.
CPC .............. *E03D 5/024* (2013.01); *B60R 15/04* (2013.01); *B61D 35/005* (2013.01); *B64D 11/02* (2013.01);
(Continued)

(58) Field of Classification Search
CPC .. E03D 5/024; E03D 1/00; E03D 1/38; B60R 15/04; B61D 35/00; B64D 11/02; E03F 1/006
(Continued)

(56) References Cited

U.S. PATENT DOCUMENTS 5,133,853 A * 7/1992 Mattsson ................ E03F 1/006
210/104
6,453,481 B1 * 9/2002 Pondelick .............. B64D 11/02
137/565.23
(Continued)

FOREIGN PATENT DOCUMENTS

DE 102004042147 A1 3/2006
JP H05246286 9/1993
(Continued)

OTHER PUBLICATIONS

WO2011012459—English Translation; machine generated Sep. 2018.*
(Continued)

*Primary Examiner* — Benjamin R Shaw
(74) *Attorney, Agent, or Firm* — Kilpatrick Townsend & Stockton LLP; Dean W. Russell; Kristin M. Crall

(57) ABSTRACT

The invention relates to a mobile sanitary device, comprising a bowl having an upper opening, a water storage tank which is connected to the bowl via a water conduit that supplies water from the water storage tank to the bowl, a wastewater tank which is connected to the bowl via a wastewater line that discharges the wastewater out of the bowl from a bowl outlet opening to the wastewater tank, a first intermediate tank which is inserted into the water conduit between the water storage tank and the bowl or into the wastewater line between the bowl outlet opening and the wastewater tank. According to the invention, a first sensor for detecting a measured value characterizing a status in the first intermediate tank is arranged on the first intermediate (Continued)

Figure 1:
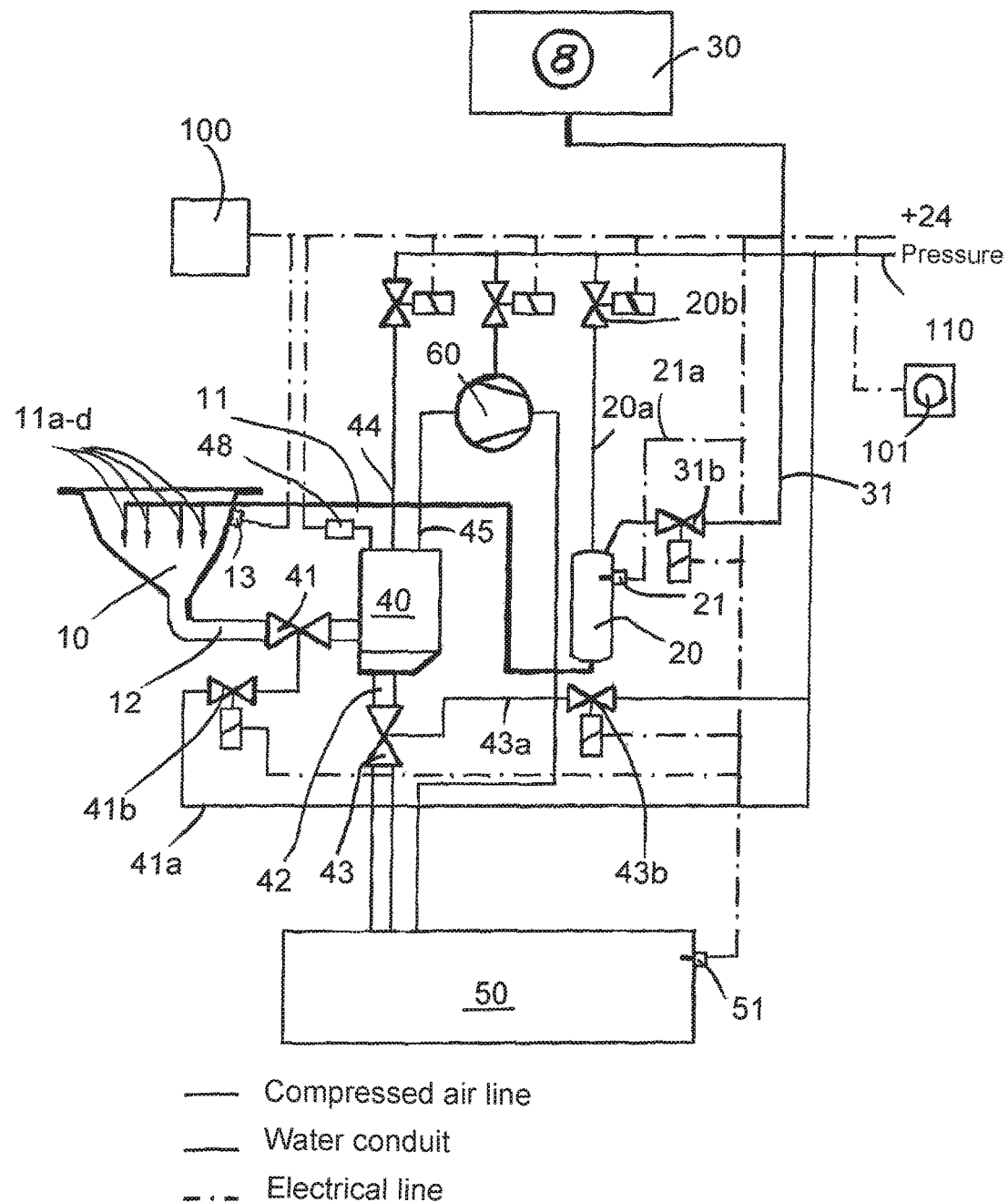

tank, and an electronic monitoring unit is provided which is in signal communication with the first sensor and comprises an electronic memory unit in which process data are stored which represent at least one setpoint value of an operational process of supplying water from the water storage tank to the bowl and of water discharge out of the bowl to the wastewater tank. The electronic monitoring unit also comprises an electronic comparator unit which is configured to compare the measured value from the first sensor with the setpoint value of the operational process and to output an error message if the measured value differs from the setpoint value.

13 Claims, 3 Drawing Sheets

(51) Int. Cl.
    *B60R 15/04*     (2006.01)
    *B64D 11/02*     (2006.01)
    *E03F 1/00*      (2006.01)
    *E03D 1/00*      (2006.01)
    *E03D 1/38*      (2006.01)

(52) U.S. Cl.
    CPC ................ *E03D 1/00* (2013.01); *E03D 1/38* (2013.01); *E03F 1/006* (2013.01)

(58) Field of Classification Search
    USPC ..................................................... 4/431, 321
    See application file for complete search history.

(56) References Cited

U.S. PATENT DOCUMENTS

| | | | | |
|---|---|---|---|---|
| 8,347,428 | B2* | 1/2013 | Hawkins | G09B 25/00 |
| | | | | 4/321 |
| 9,428,887 | B2* | 8/2016 | Zahir | E03B 1/042 |
| 2006/0225200 | A1* | 10/2006 | Wierenga | B60R 15/00 |
| | | | | 4/664 |
| 2015/0040311 | A1* | 2/2015 | Hennings | B64D 11/02 |
| | | | | 4/668 |

FOREIGN PATENT DOCUMENTS

| | | |
|---|---|---|
| JP | 2008248636 | 10/2008 |
| WO | 2007131512 A1 | 11/2007 |
| WO | 2011012459 A1 | 2/2011 |

OTHER PUBLICATIONS

International Patent Application No. PCT/EP2015/074361, Search Report and Written Opinion, dated Jan. 4, 2016.
Japan Patent Application No. 2017-521562, Office Action dated Mar. 12, 2019.

* cited by examiner

SANITARY UNIT WITH MONITORING DEVICE

CROSS REFERENCE TO RELATED APPLICATIONS

This patent application is the U.S. national phase of International Application No. PCT/EP2015/074361, filed Oct. 21, 2015, which application claims priority benefit of German Application No. 202014008423.8, filed Oct. 23, 2014, the entire contents each of which are hereby incorporated by reference.

The invention relates to a mobile sanitary device, comprising a bowl having an upper opening, a water storage tank which is connected to the bowl via a water conduit that supplies water from the water storage tank to the bowl, a wastewater tank which is connected to the bowl via a wastewater line that discharges the wastewater out of the bowl from a bowl outlet opening to the wastewater tank, a first intermediate tank which is inserted into the water conduit between the water storage tank and the bowl or into the wastewater line between the bowl outlet opening and the wastewater tank. Another aspect of the invention is a method for detecting an operating error in such a sanitary device.

Mobile sanitary devices of the kind described above are used on board vehicles, for example on rail-bound vehicles, on buses, aircraft or watercraft, and within the meaning of this description and the claims this is to be described with the expression "mobile". As their bowl, these sanitary devices may, in particular, have a toilet bowl which can then be cleaned with flush water by the functions of the sanitary device and from which wastewater and flush water can be drawn out and discharged into the wastewater tank. However, a wash hand basin, a urinal, or some other form of collecting bowl used in such sanitary facilities, such as shower basins, can be used as the bowl within the meaning of the invention.

Sanitary devices of this kind can not only supply freshwater or flush water but also discharge wastewater gravitationally, that is to say they can do so by the force of gravity alone, in principle. This is conditional on the freshwater or flush water tank being arranged above the point where the water is dispensed into the bowl, or above the bowl, and that the wastewater tank is arranged below the outlet opening of the bowl or underneath the bowl.

Such an arrangement is not possible in many cases, however, due to constructional and spatial restrictions. It is common practice, therefore, to supply freshwater and flush water and to discharge wastewater by actively driving the process, which is typically done pneumatically by means of overpressure and underpressure. In addition to the constructional and design benefits, it is also possible in this way to accelerate the supply of water and the discharge of water, thus making the sanitary device more hygienic and functional on the whole.

In many cases, it is undesirable for sanitary devices to apply an overpressure to the entire flush water or freshwater tank for that purpose, in order to convey the water out of the tank, and it is also undesirable to apply an underpressure to the entire wastewater tank in order to suck wastewater into the wastewater tank. In order to circumvent that necessity, arranging an intermediate tank downstream from the freshwater and flush water tank or inserting an intermediate tank into the wastewater line downstream from the bowl and upstream from the wastewater tank are known from the prior art. These intermediate tanks can be shut off by valves in the pipeline, thus allowing water to be sucked into the intermediate tank and water to be pressed out of the intermediate tank by producing underpressure or overpressure, respectively. Various embodiments are basically conceivable in this regard and advantageous in particular applications, which work with a combination of suction operations by means of underpressure, of pressing operations by means of overpressure, or discharge operations by means of gravitational flow of the freshwater, flush water or wastewater. Freshwater or flush water can basically be sucked out of the freshwater and flush water tank into the intermediate tank by underpressure produced in an intermediate tank, then discharged from the intermediate tank into the bowl by an overpressure produced in the former, after which the wastewater is sucked out of the bowl through another intermediate tank into the wastewater line in which an underpressure is produced, and finally conveyed into the wastewater tank by an overpressure in the latter intermediate tank. Each of these steps in pneumatic transport can also be replaced by gravitational transport.

Sanitary devices of this kind have proven themselves and are operated at a high level of automation, in which freshwater and flush water are supplied and wastewater is discharged by a control unit in a predetermined sequence. In the process, a number of valves are opened and closed, and generators or sources of underpressure and overpressure are activated or connected by opening and closing valves.

Partial or complete failure of components such as valves, underpressure generators and overpressure generators can result in a situation where a water supply operation or a water discharge operation is no longer being carried out in full, or can no longer be carried out at all. What can also happen is that the bowl or the intermediate tank is overfilled due to such a malfunction or functional impairment, which can also cause the bowl or intermediate tank to overflow. This is disadvantageous, and it is desirable to detect such malfunctions at an early stage so as to be able to take precautions against any liquids escaping.

The object of the invention is to provide a sanitary device in which any such malfunctions can be detected reliably.

This object is achieved, according to the invention, in a sanitary device of the kind initially described, in that a first sensor for detecting a measured value characterising a status in the first intermediate tank is arranged on the first intermediate tank and that an electronic monitoring unit is provided which is in signal communication with the first sensor and comprises an electronic memory unit in which process data are stored which represent at least one setpoint value of an operational process of supplying water from the water storage tank to the bowl and of water discharge out of the bowl to the wastewater tank, and that the electronic monitoring unit further comprises an electronic comparator unit which is configured to compare the measured value from the first sensor with the setpoint value of the operational process and to output an error message if the measured value differs from the setpoint value.

According to the invention, an electronic monitoring unit is used to detect any malfunctioning of the sanitary device. This electronic monitoring unit uses sensor data from a sensor which detects a status in the first intermediate tank. A status is to be understood here as a pressure, in other words an overpressure or an underpressure, a filling level, in other words a level inside the first intermediate tank or a volume of water inside the first intermediate tank, a weight of the first filled intermediate tank corresponding to that volume of water, or a temperature in the first intermediate tank. The status can be a snapshot in time, in the form of a single measured value, but the status can equally well be a sequence of measured values over time, in other words a time curve of measured values. According to the invention, this measured value or time curve of measured values is compared with a previously stored setpoint value or with previously stored setpoint time curves. These pre-stored setpoint values or setpoint time curves preferably characterise a correct operating procedure of the sanitary device, so that by making the comparison it can be established that the sanitary device is operating properly when the measured values match the setpoint values. It should be understood in this regard that each setpoint value or setpoint time curve, just like each measured value or measured time curve, is associated with a single operating status or operational process of the sanitary device and can be measured at a particular moment in time or over a particular period of such an operating procedure, in order to obtain information about how the sanitary device is working.

If the measured value or the series of measured values differs from the setpoint value or series of setpoint values, respectively, then according to the invention an error message is outputted, because it is possible to conclude that there is a functional impairment in the form of a defective component in the sanitary device. It should be understood in this regard that a deviation from a setpoint value can also be understood to mean that the setpoint value is stored as a critical value and is compared as such a critical value with the measured value. In that case, a functional impairment exists if the measured value is equal to the setpoint value, and an error message is outputted accordingly in the event of such matching values. A deviation from the setpoint value may also be established by taking a range of permissible variation into account.

In the most simple case, an error message can be understood here as a visual or acoustic signal indicating a malfunction. According to one development of the invention, however, the error message can also take the form of a coded message or a message in plain text, which provides information about the defect and also, where relevant, a description or narrowing down of the defect or of the defective component. The error message may also be used as a signal that stops the function and the further operation of the sanitary device in order to prevent any subsequent damage.

According to a first preferred embodiment, the first sensor records a series of measured values and a sequence comprising a plurality of consecutive setpoint values that form a setpoint time curve is stored in the electronic memory unit, and the electronic comparator unit is configured to compare the series of measured values with the sequence of setpoint values and to output an error message if the series of measured values differs from the sequence of setpoint values. According to this embodiment, consecutive measured values are detected by the sensor and compared with a sequence of setpoint values forming a time curve for a functional operation of the sanitary device. Based on the measured values, it is possible in this way to detect, for example, an increase or decrease in pressure or an increase or decrease in underpressure in the first intermediate tank, and to compare it with a respective sequence of setpoint values. The frequency with which the measured values are recorded may be selected according to the resolution that is needed and the length of time that measured values are recorded, and can be selected from a range extending from 1 Hertz to 1 kilohertz or more. The series of measured values can be compared with the sequence of setpoint values in such a way that gradients which can be calculated from the respective series or sequence are compared with each other. The result of such a comparison may likewise be the time at which a jump discontinuity occurs, or the presence of a jump discontinuity. For example, in the case of an operation in which wastewater is sucked out of the bowl into the first intermediate tank, the end of the flow of liquid and the resultant suction of air out of the bowl into the first intermediate tank is generally characterised by a jump discontinuity in the time curve for the underpressure in the intermediate tank, and the moment at which that jump discontinuity occurs thus allows conclusions to be drawn about the amount of wastewater that has been extracted.

It is further preferred that, when the first sensor is a pressure sensor for measuring an overpressure or underpressure in the first intermediate tank, the measured value or the series of measured values characterise an overpressure or underpressure, or an overpressure or underpressure time curve in the first intermediate tank, and the setpoint value or the sequence of setpoint values define a setpoint overpressure or underpressure or a setpoint overpressure and underpressure time curve in the first intermediate tank. A pressure sensor is to be understood here as a sensor which can detect an underpressure or overpressure in the first intermediate tank, namely qualitatively or quantitatively, that is to say, it can detect the mere presence of the underpressure or overpressure or the amount of underpressure or overpressure. Within the meaning of this description and of the claims that follow, an increase in overpressure is to be understood to mean that the pressure changes from a low pressure to a higher pressure, and an increase or intensification of an underpressure is to be understood to mean that the pressure moves from a low pressure to an even lower pressure. Accordingly, a decrease in overpressure is to be understood to mean that the pressure changes from a higher value to a lower value, and a decrease in underpressure to mean that the pressure changes from a low pressure to a higher pressure.

By measuring a respective overpressure or underpressure in the first intermediate tank, it is possible to reliably detect defects which may occur in a sanitary device. More particularly, it is possible in this way to identify leaking valves, which generally become noticeable due to a drop in the overpressure or a drop in the underpressure in the first intermediate tank, when the operating status is one in which the first intermediate tank should be shut off on all sides by the valves. By measuring a respective overpressure or underpressure, it is also possible to reliably detect when a source of underpressure or overpressure fails, in that no change in pressure or a negligible change in pressure is detected despite activation of the overpressure or underpressure source. Finally, it is possible by observing a series of pressure values measured in the first intermediate tank to determine how much liquid has been pressed out of the first intermediate tank or sucked into the first intermediate tank, as described above, and with which flow velocity this is carried out, namely by analysing the gradient of the pressure curve over time. A blockage can be inferred, for example, from a flat increase manifested as a very slow decrease in underpressure during a suction operation out of the bowl into the first intermediate tank, and a blockage of the outlet openings or nozzles into the bowl can similarly be inferred from only a slow decrease in the overpressure in a first intermediate tank, which presses freshwater or flush water into the bowl by means of overpressure.

It is further preferred that the first intermediate tank is inserted into the wastewater line between the bowl outlet opening and the wastewater tank and there is a control unit which is configured to control a suction operation out of the bowl, in that an underpressure is produced in the first intermediate tank, the first intermediate tank is placed into fluidic communication with the bowl, liquid from the bowl is sucked into the first intermediate tank, the fluidic communication between the bowl and the first intermediate tank is closed, an overpressure is produced in the first intermediate tank, and the first intermediate tank is connected to the wastewater tank, and that the comparator unit is configured to output an error message when the measured value from the sensor indicates an underpressure which is less than a setpoint underpressure, at an operating point at which an underpressure is being produced in the intermediate tank, or the measured value from the sensor indicates an underpressure time curve which falls more slowly than a setpoint underpressure time curve, at an operating point at which liquid is sucked out of the bowl into the first intermediate tank.

According to this embodiment, a preferred control sequence for the sanitary device is carried out in order to suck wastewater out of the bowl into the first intermediate tank and to discharge the wastewater our of the first intermediate tank into a wastewater tank. To that end, the first intermediate tank is inserted into the wastewater line between the bowl and the wastewater tank and can be shut off on both sides, that is to say from the bowl and from the wastewater tank, by means of valves. By switching these valves accordingly, it is then possible to produce an underpressure in the first intermediate tank when the valves on both sides of the first intermediate tank are closed, in order to suck water out of the bowl into the first intermediate tank after opening a valve, after which an overpressure is produced in the first intermediate tank, with both valves closed, in order to press the wastewater out of the tank and into the wastewater tank after opening the other valve. In this operational process, there is a basic possibility that the underpressure in the first intermediate tank does reach the desired setpoint value due to one or both valves leaking, a situation which can be detected and outputted in the form of an error message in accordance with the invention. In the event of a failure of the underpressure sources, no underpressure at all can be produced in the first intermediate tank, a situation which can again be outputted as an error message. The process of sucking wastewater out of the bowl into the first intermediate tank can also be detected on the basis of a series of measured values and compared with a respective sequence of setpoint values. If it is established on the basis of that comparison that the underpressure in the first intermediate tank is falling more slowly than predefined by the stored series of setpoint values, a blockage can be inferred and a respective error message can be outputted.

It is further preferred in this regard that the control unit is configured to control a final flushing operation out of the bowl, after the suction operation, in that the control unit initiates a process which would supply a predetermined amount of flushing fluid to the bowl, an underpressure is produced in the first intermediate tank, the first intermediate tank is placed into fluidic communication with the bowl, the flushing fluid is sucked out of the bowl into the first intermediate tank, the fluidic communication between the bowl and the first intermediate tank is closed, an overpressure is produced in the first intermediate tank, and the first intermediate tank is connected to the wastewater tank, and that the comparator unit is configured to determine an amount of flushing fluid on the basis of the time curve of the measured values from the sensor at an operating point at which the flushing fluid is sucked out of the bowl into the first intermediate tank or the flushing fluid is discharged from the first intermediate tank into the wastewater tank, and to output an error message if at that operating point the time curve of the measured values from the sensor indicates an amount of flushing fluid which is less than or more than the predetermined amount of flushing fluid. According to this embodiment, after the main operation in which the wastewater and flush water are flushed and sucked out of the bowl, a final flushing operation is carried out in which a small amount of flush water is supplied to the bowl and then sucked back out of it again. This final flushing operation and suction operation is detected on the basis of measured values from the pressure sensor in the first intermediate tank. On the basis of these measured values, it is then possible to determine whether the predetermined amount of flush water was dispensed into the bowl and sucked out of it. If it is established that a larger or a smaller amount of flush water was sucked into the first intermediate tank, the conclusion can be drawn in the former case that there is a defect in the supply of flush water and that flush water is lost elsewhere, and in the latter case that too much flush water is flowing into the bowl and may potentially cause the bowl to overflow. Both of these failure modes may result in a respective error message and also, according to the invention, to operation of the sanitary device being stopped. It should be understood in this regard that the defects arising in this regard are the result of a time interval between the main flushing operation and the final flushing operation and accordingly that the final flushing operation must be carried out within a predetermined period, which may not be too short, after the main flushing operation in the sanitary device.

According to yet another preferred embodiment, the comparator unit is configured to output error messages that differ from each other and, in the previously described case a), an error message is outputted which indicates that there is a leak in the intermediate tank or a failure of a vacuum generator, in case b) an error message is outputted which indicates that there is a blockage in the wastewater line between the bowl and the first intermediate tank, and in case c) an error message is outputted which indicates that there is a leak in the flushing system. According to this embodiment, the error message indicates which kind of defect was established by comparing the measured values with the setpoint values, and this kind of defect is outputted in the form of a coded error message or an error message in plain text. This output can be provided in the form of wireless data transmission, a visual display or the like.

It is further preferred that the first intermediate tank is inserted into the water conduit between the freshwater tank and the bowl, and that the first sensor is a filling-level sensor. According to this embodiment, the first intermediate tank is inserted into the freshwater and flush water line between the water storage tank and the bowl. It should be understood in this regard that this embodiment may be implemented as an alternative or in addition to the two aforementioned embodiments having a first intermediate tank in the wastewater line. In the case of the embodiment having a first intermediate tank in the water conduit, the sensor is preferably provided in the form of a filling-level sensor. However, it should be understood as a basic principle that the sensor in this embodiment may also be provided in the form of a pressure sensor for detecting an overpressure or an underpressure in the first intermediate tank in the water conduit. The filling-level sensor may be embodied in such a form that it indicates the presence of liquid at a specific level of the intermediate tank, or that it detects the filling level in the first intermediate tank quantitatively. With the aid of the filling-level sensor, it is thus possible to detect whether the liquid has reached or exceeded a specific level in the first intermediate tank.

It is particularly preferred in this regard that the filling-level sensor is arranged and configured to output a signal when the water in the first intermediate tank is above a setpoint level. By means of such an arrangement of the filling-level sensor, for example by arranging the filling-level sensor itself at a height which is above a setpoint level in the first intermediate tank, a particularly preferred way of controlling the device is made possible. Such control entails filling the first intermediate tank with water from the water storage tank until the filling-level sensor indicates that the water is above the setpoint level and subsequently dispensing a smaller, predetermined amount of water from the first intermediate tank into the bowl in order to thus reach the setpoint level. In this case, the filling-level sensor does not show any signal, as the liquid is below the level monitored by the filling-level sensor, but it immediately indicates when the setpoint level is exceeded, in that it then transitions from the non-activated to the activated state when water flows into the first intermediate tank because of a defect.

For this purpose, it is particularly preferred that the comparator unit is configured to output an error message, in standby operation during which no flushing occurs, if the filling-level sensor outputs a signal that water in the first intermediate tank is above a setpoint level. This configuration reliably prevents the first intermediate tank from overflowing, for example if the valve between the water storage tank and the first intermediate tank id defective, in that any exceeding of the setpoint level is immediately detected by the filling-level sensor and can be established by the comparator unit.

It is further preferred that a control unit performs a suction operation from the first intermediate tank and outputs an error message if a signal is received that water in the first intermediate tank is above a setpoint level. By means of the control unit, it is possible in this way to prevent the first intermediate tank from overflowing and the excess water can be discharged from the first intermediate tank. The identified defect is displayed at the same time so that repair can be initiated. The suction operation is repeated several times, if necessary, so that although the water is progressively moved from the water storage tank into the wastewater tank because of the defect, any escape or overflow, with subsequent concomitant damage, is avoided.

According to another preferred embodiment, a control unit controls filling of the first intermediate tank, in that the first intermediate tank is filled with water from the water storage tank until the filling-level sensor outputs a signal indicating that the water level in the intermediate tank is above a setpoint level, after which a predetermined amount of water is discharged from the intermediate tank into the bowl. A level of water stored in the first intermediate tank and which is lower than the level at which the filling-level sensor is triggered at a setpoint level can be reliably set with this way of controlling. The amount of water according to setpoint level is sufficient to carry out a flushing operation. At the same time, the small, predetermined amount of water which is discharged from the first intermediate tank, after it has been filled beyond the setpoint level, can be used for final flushing as described above. At the same time, due to the filling-level sensor being located above the setpoint level, any rise in the water level in the first intermediate tank beyond the setpoint level due to a defect is detected immediately and can be signalled in the form of an error message.

According to another preferred embodiment, the first intermediate tank is inserted into the wastewater line between the bowl outlet opening and the wastewater tank and the first sensor is a pressure sensor for detecting an underpressure or overpressure in the first intermediate tank, and a second intermediate tank is inserted into the water conduit between the freshwater tank and the bowl and a second sensor is arranged as a filling-level sensor on the second intermediate tank. According to this embodiment, a first intermediate tank is provided in the wastewater line and a second intermediate tank in the water conduit, as a result of which it is possible to monitor functions not only on the water supply side, but also on the wastewater discharge side.

It is particularly preferred in this regard that the first intermediate tank and the sensor arranged therein, and the second intermediate tank and the filling-level sensor arranged therein, are developed in the manner described in the foregoing, the second intermediate tank corresponding to the first intermediate tank inserted into the water conduit between the water storage tank and the bowl.

Another aspect of the invention relates to a method for detecting an operating error in a sanitary device, the method comprising the steps of: discharging wastewater from a bowl into a first intermediate tank by applying an underpressure to the first intermediate tank or discharging water from a water storage tank into a second intermediate tank and pressing the water out of the second intermediate tank into a bowl by applying an overpressure to the water in the second intermediate tank, wherein, by means of a sensor on the first or second intermediate tank, a measured value is detected which characterises a status in the first or second intermediate tank, and the measured value is compared by means of an electronic comparator unit with a setpoint value obtained from process data stored in an electronic memory unit, and an error message is outputted if the measured value differs from the setpoint value.

The method can be developed by providing the sensor in the form of a pressure sensor on the first intermediate tank, and by an error message being outputted if the measured value from the sensor indicates an underpressure which is less than a setpoint underpressure, at an operating point at which an underpressure is being produced in the intermediate tank, or the measured value from the sensor indicates an underpressure time curve which falls more slowly than a setpoint underpressure time curve, at an operating point at which liquid is sucked out of the bowl into the first intermediate tank.

The method can also be developed by providing the sensor in the form of a filling-level sensor on the second intermediate tank, and by an error message being outputted if the measured value from the sensor indicates that the water in the intermediate tank has risen above the setpoint level at an operating point at which water is stored below a setpoint level in standby operation.

Finally, the method can be developed such that, after a suction operation, a final flushing operation out of the bowl is controlled, in that a process is initiated which would supply a predetermined amount of flushing fluid to the bowl, an underpressure is produced in the first intermediate tank, the first intermediate tank is placed into fluidic communication with the bowl, the flushing fluid is sucked out of the bowl into the first intermediate tank, the fluidic communication between the bowl and the first intermediate tank is closed, an overpressure is produced in the first intermediate tank, and the first intermediate tank is connected to the wastewater tank, and that the time curve of the measured values from the pressure sensor, at an operating point at which the flushing fluid is sucked out of the bowl into the first intermediate tank or the flushing fluid is discharged from the first intermediate tank into the wastewater tank, is compared with a setpoint time curve which defines the pressure time curve for the predetermined amount of flushing fluid and outputs an error message when the time curve of the measured values from the pressure sensor at that operating point indicates an amount of flushing fluid which is less than or more than the predetermined amount of flushing fluid.

With regard to the method and the development of the method, reference is made to the sanitary device described in the foregoing and to its development and ways of operating, which can also be applied accordingly to the method and its development.

Figure 2A:
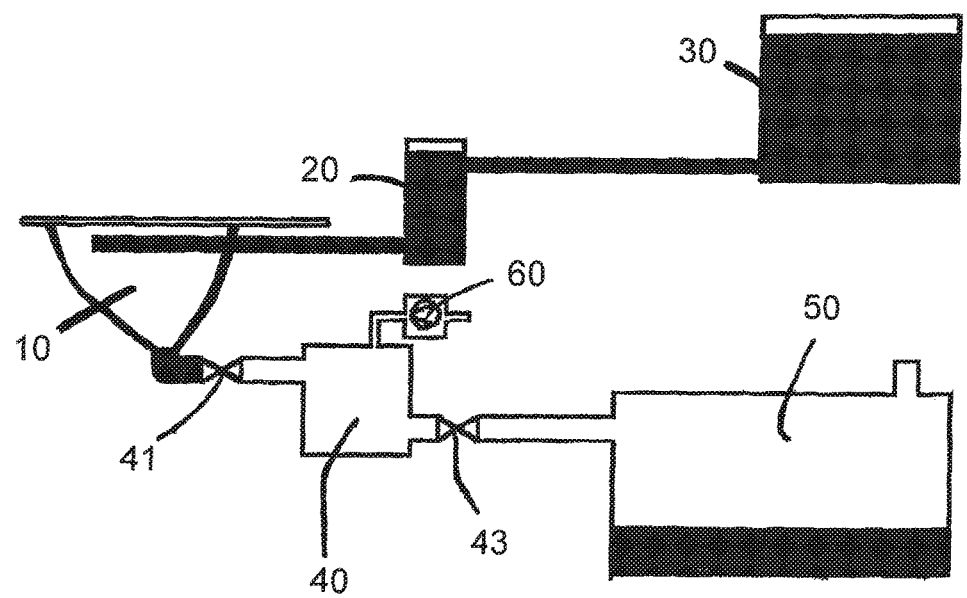
Figure 2B:
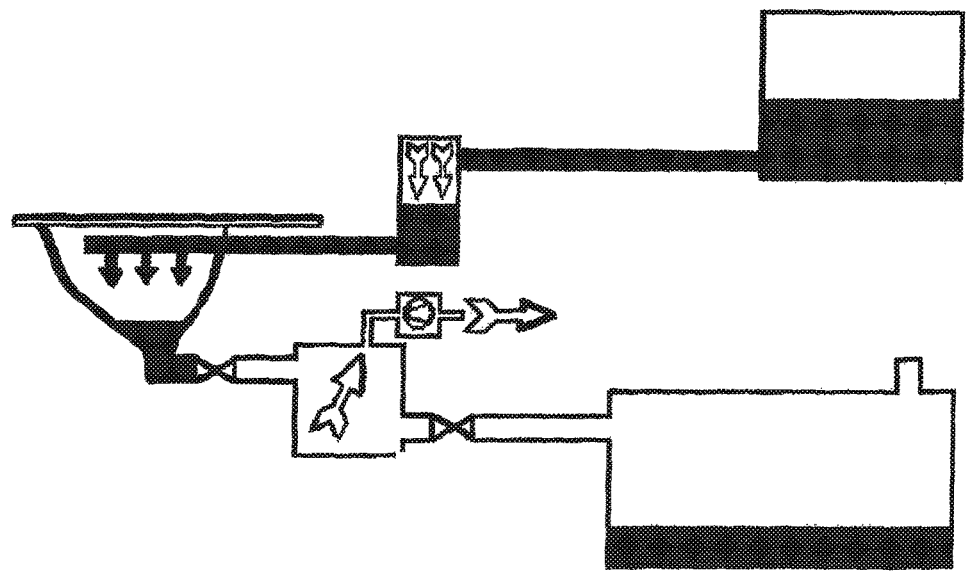
Figure 2C:
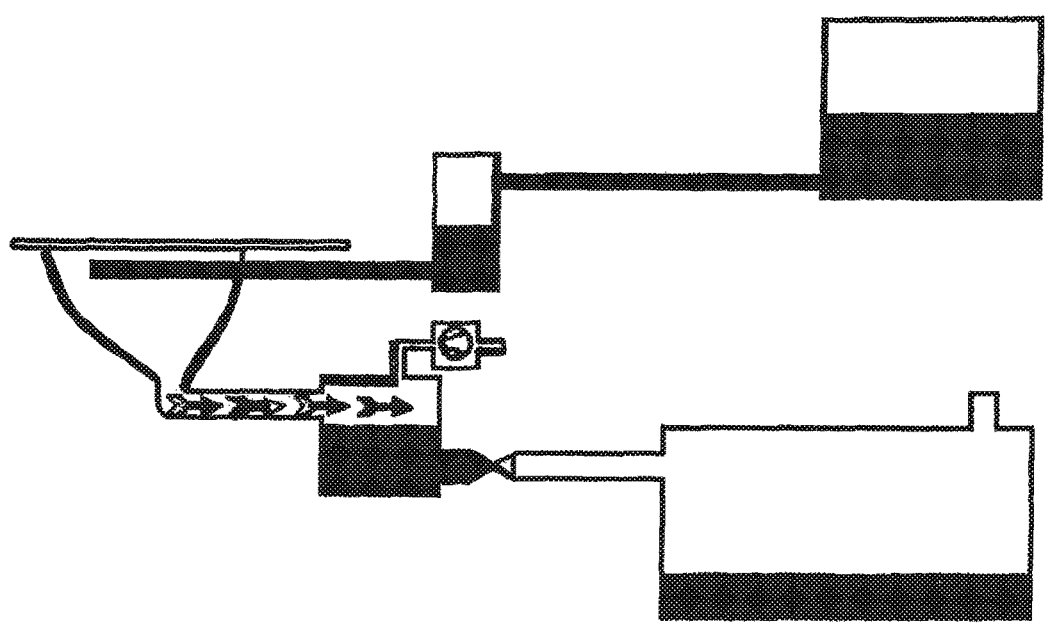

A preferred embodiment of the invention shall now be described with reference to the attached Figures, in which:

FIG. 1 shows a schematic structure of a preferred embodiment of a sanitary device according to the invention, FIGS. 2*a-c* show the course of a flushing and suction operation for a toilet bowl according to the preferred embodiment shown in FIG. 1.

The preferred embodiment has a toilet bowl 10 into which a flush water line 11 having a plurality of discharge nozzles 11*a-d* opens. Flush water line 11 is connected to an intermediate flush water tank 20, which is connected via a water supply conduit to a water storage tank 30. Water can be supplied by the force of gravity to the intermediate flush water tank 20 from water storage tank 30 via water supply conduit 31.

A filling-level sensor 21 which is connected via a signal line 21*a* to a control unit 100 is arranged on the flush water container at a level close to the upper end. An electromagnetically driven water supply valve 31*b* which is controlled by the control unit in order to fill the intermediate flush water tank 20 from the freshwater tank 30 is disposed in water supply conduit 31.

The intermediate flush water tank can also be pressurised with compressed air by means of a compressed air line 20*a*. The compressed air is controlled by a flush water compressed air valve 20*b*.

In the direction of gravity, the intermediate flush water tank lies below discharge nozzles 11*a-d*. The intermediate flush water tank can therefore be filled with flush water, and after water supply valve 31*b* has been closed, said water can be discharged from flush water nozzles 11*a-d* into bowl 10 by pressurising the intermediate flush water tank with compressed air. Filling-level sensor 21 is located above a setpoint level of the flush water in the intermediate flush water tank. The intermediate flush water tank is filled in such a way that water from freshwater tank 30 is supplied until it reaches the height of the filling-level sensor, after which a small amount of water is dispensed into the bowl via nozzles 11*a-d*, as a result of which the water level drops to below the filling-level sensor. The filling-level sensor can then monitor the level in the intermediate flush water tank and output a signal as soon as the water level in the intermediate flush water tank rises. By this means, it is possible to detect a defect of valve 31*b* in a reliable manner.

Bowl 10 has a wastewater line 12 which is connected via a wastewater valve 41 to an intermediate wastewater tank 40. At its bottom end, the intermediate wastewater tank has a wastewater line 42 which can be opened and closed by a shut-off valve 43. Wastewater line 42 opens into a wastewater tank 50. Valves 41 and 43 are pneumatically operated and are opened and closed by via compressed air lines. To that end, the valves are connected to a compressed air source 110 via respective compressed air lines 41*a*, 43*a* in which electromagnetic pneumatic valves 41*b*, 43*b* are arranged.

The intermediate wastewater tank also has a compressed air port 44 disposed at its upper end, and a vacuum port 45 disposed at its upper end. Vacuum port 45 is connected to a vacuum pump 60 which is driven by compressed air.

A pressure sensor 48 which is connected via a signal line to the control unit is also mounted at the upper end of the intermediate wastewater tank.

The sanitary device according to the preferred embodiment also has a filling-level sensor 51 on the wastewater tank and a filling-level sensor 13 on the bowl, which can send a signal to the control unit by means of a signal line when a particular filling level in the wastewater tank or respectively in the bowl has been reached.

By means of pressure sensor 48, it is possible to monitor the underpressure being produced in the intermediate wastewater tank by means of vacuum pump 60. If a predetermined underpressure is not reached or is reached too slowly, it is inferred that there is a defective vacuum pump or defective valves 41 or 43, and a respective error message is outputted. Pressure sensor 48 can also monitor the decreasing vacuum in the intermediate wastewater tank as a series of measured values. It is possible in this way to check whether the vacuum is decreasing at a predetermined rate, or not. If the vacuum in the intermediate wastewater tank decreases too slowly when the wastewater is being sucked out of the bowl, a blockage of wastewater line 12 can be inferred. Similarly, if the overpressure drops too slowly when discharging the wastewater from intermediate wastewater tank 40 into the wastewater tank, a blockage in wastewater feed line 42 can be inferred.

A flushing and suction operation in the preferred embodiment shall now be described with reference to FIGS. 2*a-c*.

Intermediate flush water tank 20 is firstly filled gravitationally with flush water from freshwater tank 30 until the filling-level sensor indicates that the upper level has been reached. A small amount of flush water is then dispensed into bowl 10 so that the water level drops to below the filling-level sensor (FIG. 2*a*). From that level, flush water can then be dispensed into the bowl when the flushing operation is initiated by a push-button 101.

At the same time, a vacuum is produced in the intermediate wastewater tank lines by vacuum pump 60, with wastewater valve 41 and wastewater tank valve 43 both being closed. The degree of that vacuum is monitored by the pressure sensor on the intermediate wastewater tank, and the vacuum pump is switched off when a predetermined underpressure is reached (FIG. 2*b*). If the predetermined degree of vacuum is not reached within a predetermined maximum duration, or if the vacuum increases only slightly, the control unit establishes on the basis of the measured values from the pressure sensor that there must be a defect in the vacuum pump or the wastewater valve or the wastewater tank valve.

Once the predetermined degree of vacuum has been reached in the intermediate wastewater tank, the wastewater valve is opened and the wastewater is sucked by the vacuum out of the bowl and into the intermediate tank (FIG. 2*c*). This suction operation is again monitored by the pressure sensor, in that the resultant drop in the vacuum in the intermediate wastewater tank is detected. If the vacuum in the intermediate wastewater tank decreases too slowly, a blockage in wastewater line 12 is inferred.

A sudden drop in the degree of vacuum in the intermediate wastewater tank signals to the control unit that all the wastewater has been sucked out of the bowl. In that case, wastewater valve 41 is closed and the intermediate wastewater tank is pressurised with an overpressure via the compressed air line. Once a predetermined level of overpressure has been reached, the wastewater tank is opened and the wastewater is pressed out of the intermediate wastewater tank via the wastewater line into the wastewater tank.

The invention claimed is:
1. A mobile sanitary device, comprising:
a bowl having an upper opening,
a freshwater tank which is connected to the bowl via a water conduit that supplies water from the freshwater tank to the bowl,
a wastewater tank which is connected to the bowl via a wastewater line that discharges the wastewater out of the bowl from a bowl outlet opening to the wastewater tank,
a first intermediate tank which
is inserted into the water conduit between the freshwater tank and the bowl or
into the wastewater line between the bowl outlet opening and the wastewater tank,
wherein a first sensor for detecting a measured value characterising a status in the first intermediate tank is arranged on the first intermediate tank and an electronic monitoring unit is provided which is in signal communication with the first sensor and comprises an electronic memory unit in which process data are stored which represent at least one setpoint value of an operational process of supplying water from the freshwater tank to the bowl and of water discharge out of the bowl to the wastewater tank, and the electronic monitoring unit further comprises an electronic comparator unit which is configured to compare the measured value from the first sensor with the at least one setpoint value of the operational process and to output an error message if the measured value differs from the at least one setpoint value, wherein
the first sensor records a series of measured values and
a sequence comprising a plurality of consecutive setpoint values that form a setpoint profile is stored in the electronic memory unit,
and the electronic comparator unit is configured to compare the series of measured values with the sequence of setpoint values and to output an error message if the series of measured values differs from the sequence of setpoint values.

2. The sanitary device according to claim 1,
wherein the first sensor is a pressure sensor for measuring an overpressure or underpressure in the first intermediate tank,
wherein the series of measured values comprises an overpressure or underpressure time curve in the first intermediate tank, and
wherein the sequence comprising a plurality of consecutive of setpoint values define an underpressure time curve in the first intermediate tank.

3. The sanitary device according to claim 1,
wherein the first intermediate tank is inserted into the wastewater line between the bowl outlet opening and the wastewater tank and there is a control unit which is configured to control a suction operation out of the bowl, in that
an underpressure is produced in the first intermediate tank,
the first intermediate tank is placed into fluidic communication with the bowl,
liquid from the bowl is sucked into the first intermediate tank,
the fluidic communication between the bowl and the first intermediate tank is closed,
an overpressure is produced in the first intermediate tank, and
the first intermediate tank is connected to the wastewater tank,
and the electronic comparator unit is configured to output an error message when the measured value from the sensor indicates an underpressure which is less than a setpoint underpressure, at an operating point at which an underpressure is being produced in the intermediate tank.

4. The sanitary device according to claim 1,
wherein the control unit is configured to control a final flushing operation out of the bowl, after the suction operation, in that
the control unit initiates a process which would supply a predetermined amount of flushing fluid to the bowl,
an underpressure is produced in the first intermediate tank,
the first intermediate tank is placed into fluidic communication with the bowl,
the flushing fluid is sucked out of the bowl into the first intermediate tank,
the fluidic communication between the bowl and the first intermediate tank is closed,
an overpressure is produced in the first intermediate tank, and
the first intermediate tank is connected to the wastewater tank,
and in that the electronic comparator unit is configured to determine an amount of flushing fluid on the basis of the time curve of the measured values from the sensor at an operating point at which the flushing fluid is sucked out of the bowl into the first intermediate tank or the flushing fluid is discharged from the first intermediate tank into the wastewater tank, and to output an error message if
at that operating point the time curve of the measured values from the sensor indicates an amount of flushing fluid which is less than or more than the predetermined amount of flushing fluid.

5. The sanitary device according to claim 1,
wherein the electronic comparator unit is configured to output error messages that differ from each other and
in case a) an error message is outputted which indicates that there is a leak in the intermediate tank or a failure of a vacuum generator,
in case b) an error message is outputted which indicates that there is a blockage in the wastewater line between the bowl and the first intermediate tank, and
in case c) an error message is outputted which indicates that there is a leak in the flushing system.

6. The sanitary device according to claim 1,
wherein the first intermediate tank is inserted into the water conduit between the freshwater tank and the bowl and that the first sensor comprises a filling-level sensor.

7. The sanitary device according to claim 6,
wherein the filling-level sensor is arranged and configured to output a signal when the water in the first intermediate tank is above a setpoint level.

8. A mobile sanitary device, comprising:
a bowl having an upper opening,
a freshwater tank which is connected to the bowl via a water conduit that supplies water from the freshwater tank to the bowl, a wastewater tank which is connected to the bowl via a wastewater line that discharges the wastewater out of the bowl from a bowl outlet opening to the wastewater tank, a first intermediate tank which
is inserted into the water conduit between the freshwater tank and the bowl or
into the wastewater line between the bowl outlet opening and the wastewater tank, wherein a first sensor for detecting a measured value characterising a status in the first intermediate tank is arranged on the first intermediate tank and an electronic monitoring unit is provided which is in signal communication with the first sensor and comprises an electronic memory unit in which process data are stored which represent at least one setpoint value of an operational process of supplying water from the freshwater tank to the bowl and of water discharge out of the bowl to the wastewater tank, and the electronic monitoring unit further comprises an electronic comparator unit which is configured to compare the measured value from the first sensor with the at least one setpoint value of the operational process and to output an error message if the measured value differs from the at least one setpoint value, wherein the first intermediate tank is inserted into the water conduit between the freshwater tank and the bowl and that the first sensor is a filling-level sensor, wherein the filling-level sensor is arranged and configured to output a signal when the water in the first intermediate tank is above a setpoint level, and wherein the comparator unit is configured
to output an error message, in standby operation during which no flushing occurs, if the filling-level sensor outputs a signal that water in the first intermediate tank is above a setpoint level.

9. The sanitary device according to claim 8,
wherein a control unit performs a suction operation from the first intermediate tank and outputs an error message if a signal is received that water in the first intermediate tank is above a setpoint level.

10. A mobile sanitary device, comprising:
a bowl having an upper opening,
a freshwater tank which is connected to the bowl via a water conduit that supplies water from the freshwater tank to the bowl,
a wastewater tank which is connected to the bowl via a wastewater line that discharges the wastewater out of the bowl from a bowl outlet opening to the wastewater tank,
a first intermediate tank which
is inserted into the water conduit between the freshwater tank and the bowl or
into the wastewater line between the bowl outlet opening and the wastewater tank, wherein a first sensor for detecting a measured value characterising a status in the first intermediate tank is arranged on the first intermediate tank and an electronic monitoring unit is provided which is in signal communication with the first sensor and comprises an electronic memory unit in which process data are stored which represent at least one setpoint value of an operational process of supplying water from the freshwater tank to the bowl and of water discharge out of the bowl to the wastewater tank, and the electronic monitoring unit further comprises an electronic comparator unit which is configured to compare the measured value from the first sensor with the at least one setpoint value of the operational process and to output an error message if the measured value differs from the at least one setpoint value, wherein the first intermediate tank is inserted into the water conduit between the freshwater tank and the bowl and that the first sensor is a filling-level sensor, and wherein a control unit controls filling of the first intermediate tank, in that
the first intermediate tank is filled with water from the freshwater tank until the filling-level sensor outputs a signal indicating that the water level in the intermediate tank is above a setpoint level, after which
a predetermined amount of water is discharged from the intermediate tank into the bowl.

11. The sanitary device according to claim 10,
wherein the first intermediate tank is inserted into the wastewater line between the bowl outlet opening and the wastewater tank and the first sensor is a pressure sensor for detecting an underpressure or overpressure in the first intermediate tank, and
a second intermediate tank is inserted into the water conduit between the freshwater tank and the bowl and a second sensor is arranged as a filling-level sensor on the second intermediate tank.

12. The sanitary device according to claim 1,
wherein the first intermediate tank is inserted into the wastewater line between the bowl outlet opening and the wastewater tank and there is a control unit which is configured to control a suction operation out of the bowl, in that
an underpressure is produced in the first intermediate tank,
the first intermediate tank is placed into fluidic communication with the bowl,
liquid from the bowl is sucked into the first intermediate tank,
the fluidic communication between the bowl and the first intermediate tank is closed,
an overpressure is produced in the first intermediate tank, and
the first intermediate tank is connected to the wastewater tank,
and the electronic comparator unit is configured to output an error message when
the measured value from the sensor indicates an underpressure time curve which falls more slowly than a setpoint underpressure time curve, at an operating point at which liquid is sucked out of the bowl into the first intermediate tank.

13. The sanitary device according to claim 1,
wherein the first intermediate tank is inserted into the water conduit between the freshwater tank and the bowl and that the first sensor comprises a filling-level sensor.

* * * * *

UNITED STATES PATENT AND TRADEMARK OFFICE
CERTIFICATE OF CORRECTION

PATENT NO. : 10,422,117 B2
APPLICATION NO. : 15/520909
DATED : September 24, 2019
INVENTOR(S) : Dennis Getmann et al.

It is certified that error appears in the above-identified patent and that said Letters Patent is hereby corrected as shown below:

On the Title Page

In Item (30), under Foreign Application Priority Data, delete "20 2014 008 423 U" and insert --20 2014 008 423.8-- therefor.

Signed and Sealed this
Seventh Day of April, 2020

Andrei Iancu
*Director of the United States Patent and Trademark Office*